June 27, 1972 R. KAISER 3,673,012

METHOD OF PRODUCING A TRANSISTOR

Filed July 29, 1969 2 Sheets-Sheet 1

Inventor:

Reinhold Kaiser

By: Spencer & Kaye

Attorneys

METHOD OF PRODUCING A TRANSISTOR

Filed July 29, 1969 2 Sheets-Sheet 2

Inventor:
Reinhold Kaiser
By: Spencer & Kaye
Attorneys

1

3,673,012

METHOD OF PRODUCING A TRANSISTOR

Reinhold Kaiser, Heilbronn, Germany, assignor to Telefunken Patentverwertungsgesellschaft m.b.H., Ulm (Danube), Germany Filed July 29, 1969, Ser. No. 845,773
Claims priority, application Germany, Aug. 1, 1968, P 17 64 766.4
Int. Cl. H011 7/44
U.S. Cl. 148—187 2 Claims

ABSTRACT OF THE DISCLOSURE

The invention relates to a method of producing a transistor, such as a control transistor in which the emitter regions are formed by diffusion through strip-like apertures in an insulating layer on a semiconductor body. The strips are positioned side by side and decrease in width in the direction of succession of the strips.

BACKGROUND OF THE INVENTION

The invention relates to a method of producing a transistor, in particular a control transistor, wherein the emitter diffusion is effected through strip-like apertures in an insulating layer on the semiconductor body. In such a method, the invention consists in that the strip-like apertures have different widths. The advantage of the invention is that, through it, the control characteristics of the transistor are improved. This is particularly the case if the strip-like apertures are disposed side by side like the rungs of a ladder, the width of the strip-like apertures decreasing in the direction of succession of the strips.

SUMMARY OF THE INVENTION

According to the invention, there is provided a method of producing a transistor, in particular a control transistor, in which the emitter diffusion is effected through strip-like apertures in an insulating layer present on the semiconductor body, and in which the strip-like apertures are of different widths.

BRIEF DESCRIPTION OF THE DRAWINGS

The invention will now be described by way of example with reference to the accompanying drawings in which.

DESCRIPTION OF THE PREFERRED EMBODIMENT

Figure 1:
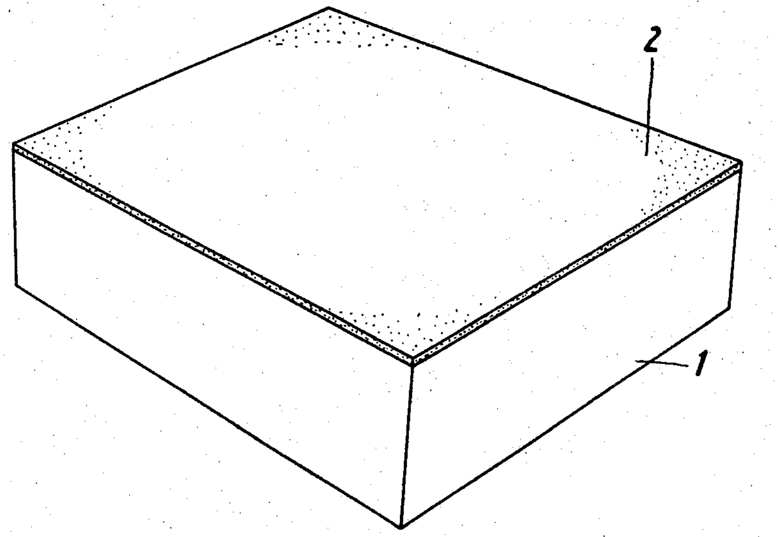
FIG. 1 is a perspective of a semiconductor body with an insulating layer therein.

In order to produce a transistor according to the invention, the starting point is for example a semiconductor body 1 of silicon as shown in FIG. 1, which is of n-type conductivity for example, and has a specific resistance of about 10 ohm cm. An insulating layer 2, which may consist of silicon dioxide or of silicon nitride for example, is applied to this semiconductor body. The thickness of the insulating layer may amount to 1$\mu$ for example.

2

Figure 2:
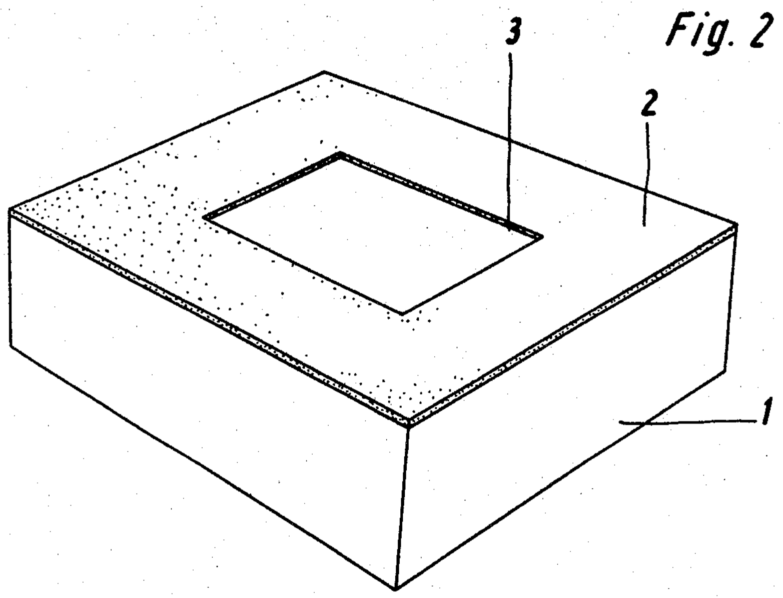
FIG. 2 is a view similar to FIG. 1 with an aperture for the diffusion of the base material removed from the insulating layer.

A base window 3, the size of which may be 40$\mu$ by 60$\mu$ for example, is formed in the insulating layer 2 as shown in FIG. 2. The base region is diffused into the semiconductor body through this base window for example by diffusing in boron at a temperature of 1100° C. The thickness of the base region may amount to 6$\mu$ for example.

Figure 3:
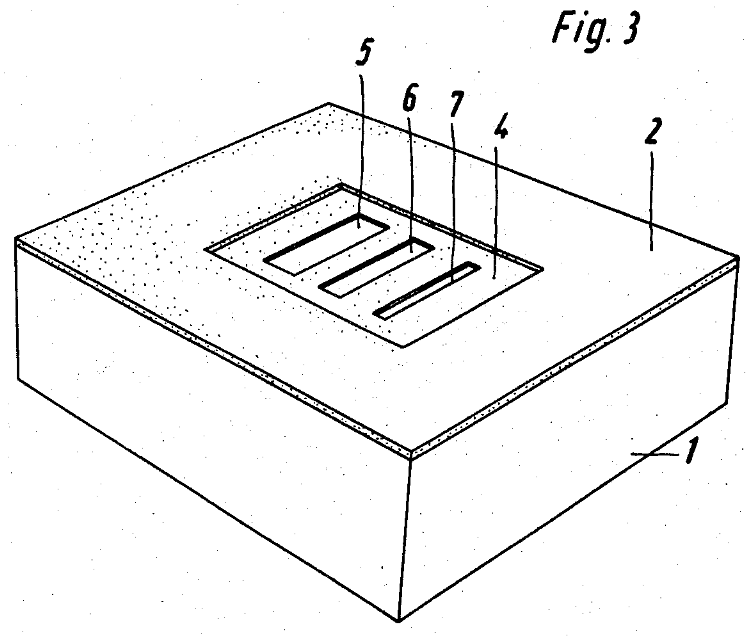
FIG. 3 shows the formation of strip-like apertures for diffusion of the emitter material.

After or during the base diffusion, oxidation is again effected so that the base window 3 is again covered with an oxide layer 4. Emitter diffusion windows 5, 6, 7, which according to the invention have different width, are then formed in this oxide layer 4, as shown in FIG. 3. As a result, the emitter regions diffused into the semiconductor body also have different widths.

The emitter diffusion windows which are disposed parallel to one another are selected in the example so that their width decreases from left to right. Consequently, the diffusion window 5 has the greatest width, the middle diffusion window 6 the second greatest width, while the right-hand diffusion window 7 has the narrowest width. The width of the left-hand emitter diffusion window may be 6$\mu$ for example, that of the middle emitter diffusion window 6 may be 4$\mu$ for example, and that of the right-hand emitter diffusion window 7 be 2$\mu$ for example. A greater or smaller number of emitter diffusion windows may, of course, be disposed side by side. The length of the strip-like emitter diffusion windows 5, 6 and 7 illustrated in FIG. 3 may be 30$\mu$ for example.

The production of the emitter regions in the semiconductor body is effected by means of a common diffusion through the individual emitter diffusion windows. That is to say, impurities are diffused into the semiconductor body or into the base region already present in the semiconductor body, through all the emitter diffusion windows in a common diffusion process. A suitable doping material for producing the emitter regions is phosphorus for example, which is diffused into the semiconductor body at a temperature of 1100° C. for example.

It has now been found that a planar transistor, or indeed any transistor, wherein the emitter diffusion is effected through emitter diffusion windows of different widths into an insulating layer present on the semiconductor body and serving as a diffusion mask, surprisingly has particularly satisfactory control characteristics.

Making of contact to the emitter regions diffused into the semiconductor body is effected by vapour deposition of contact-making material on the regions of the semiconductor surface exposed through the emitter diffusion windows 5, 6 and 7. In order to make contact to the base region, apertures must be formed in the oxide layer 4, which is not illustrated in FIG. 3.

Figure 4:
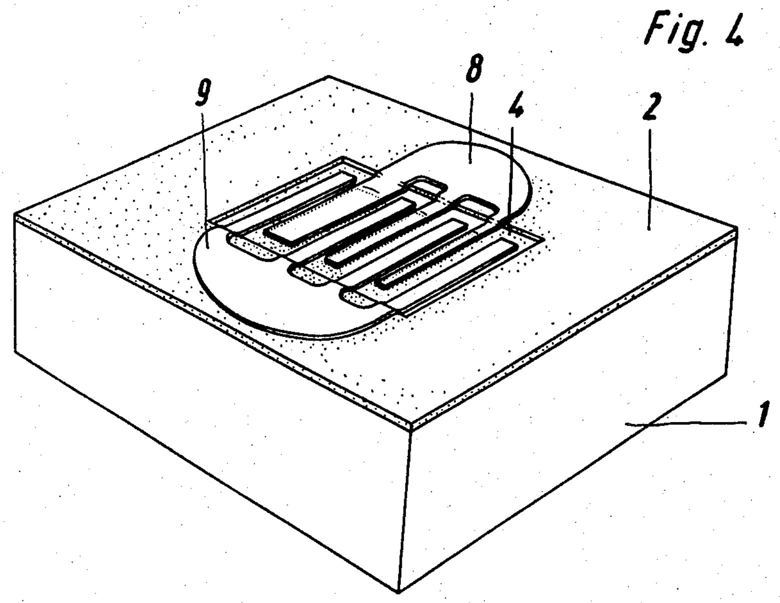
FIG. 4 shows the finished transistor.

FIG. 4 shows the control transistor with contacts fully provided. As this figure shows, contact is made both to the emitter regions and to the base region by means of a comb-like structure. The common emitter electrode is designated by 8 in FIG. 4, while the base electrode has the reference numeral 9.

What I claim as new and desire to secure by Letters Patent of the United States is:

1. In a method of producing a transistor the improvement comprising forming the emitter of the transistor by the steps of: forming an insulating layer on a surface of a semiconductor body containing a base region which extends to said surface; removing portions of said insulating layer overlying the base region to form a plurality of strip-like apertures of different width in the insulating layer; and diffusing emitter material through said strip-like apertures into the base region in said semiconductor body.

2. In a method of producing a transistor the improvement comprising forming the emitter of the transistor by the steps of: forming an isulating layer on a surface of a semiconductor body; removing strip-like portions of said insulating layer in spaced side by side relationship to form strip-like apertures of different widths in the insulating layer, said strip-like portions having decreasing widths in the direction of the succession of said strip-like portions; and diffusing emitter material through said strip-like apertures into said semiconductor body.

References Cited

UNITED STATES PATENTS

| | | | |
|---|---|---|---|
| 3,412,460 | 11/1968 | Lin | 148—187 |
| 3,418,181 | 12/1968 | Robinson | 148—187 |

L. DEWAYNE RUTLEDGE, Primary Examiner

J. M. DAVIS, Assistant Examiner

U.S. Cl. X.R.

29—578; 317—235 R